United States Patent
Österlund

[19]

[11] Patent Number: 5,951,334
[45] Date of Patent: Sep. 14, 1999

[54] JUNCTION BOX FOR PRINTED CIRCUITS

[75] Inventor: Carl-Gunnar Österlund, Vallentuna, Sweden

[73] Assignee: Fatum Produkt AB, Vallentuna, Sweden

[21] Appl. No.: 08/875,773

[22] PCT Filed: Feb. 12, 1996

[86] PCT No.: PCT/SE96/00175

§ 371 Date: Aug. 5, 1997

§ 102(e) Date: Aug. 5, 1997

[87] PCT Pub. No.: WO96/25011

PCT Pub. Date: Aug. 15, 1996

[30] Foreign Application Priority Data

Feb. 10, 1995 [SE] Sweden ................................ 95 00484

[51] Int. Cl.⁶ ........................................................ H01R 9/22
[52] U.S. Cl. ........................................... 439/719; 439/532
[58] Field of Search ................................... 439/709, 719, 439/532

[56] References Cited

U.S. PATENT DOCUMENTS

| D. 299,492 | 1/1989 | Gregon | 439/719 |
|---|---|---|---|
| 3,777,223 | 12/1973 | Chandler et al. | 439/719 |
| 3,831,128 | 8/1974 | Paluch . | |
| 4,595,799 | 6/1986 | Krob et al. . | |
| 4,767,338 | 8/1988 | Dennis et al. | 439/532 |
| 5,779,504 | 7/1998 | Dominiak et al. | 439/532 |

FOREIGN PATENT DOCUMENTS 7 409 495  1/1975  Sweden .

Primary Examiner—Steven L. Stephan
Assistant Examiner—J. F. Duverne
Attorney, Agent, or Firm—Browdy and Neimark

[57] ABSTRACT

A junction box for data and/or telecommunication installations comprises a printed circuit board (12) which is mounted to a rear supporting plate (10) and provided with terminal blocks (13), mounted on the front side thereof. The circuit board (12) is mounted at a distance in front of the supporting plate (10) to form a free wire laying space (19) behind the circuit board (12), between said board and the supporting plate (10). The supporting plate (10) is provided with wire lead-in openings (26), located behind the circuit board (12), and the circuit board (12) is provided with wire lead-in openings (25) which are formed by cut-outs in the circuit board (12), extending into said board from edge portions (23, 24) thereof. The wire lead-in openings (26) in the supporting plate (10) are located in displaced positions in the supporting plate (10) in relation to the wire lead-in openings (25) in the circuit board (12) and at a distance from the latter openings.

11 Claims, 3 Drawing Sheets

JUNCTION BOX FOR PRINTED CIRCUITS

BACKGROUND OF THE INVENTION

TECHNICAL FILED OF THE INVENTION

The present invention relates to a junction box for data and/or telecommunication installations. More particularly, the invention relates to such a junction box of the kind comprising a printed circuit board which is mounted to a rear supporting plate and provided with one or more terminal blocks, mounted to the circuit board on the front side thereof.

PRIOR ART

The invention has for its purpose to provide a junction box which is substantially improved in relation to previously known junction boxes of the above kind and which above all facilitates the steps of drawing in wires into the junction box and connecting them to the terminal blocks mounted to the circuit board.

SUMMARY AND OBJECTION OF THE INVENTION

The junction box according to the invention proposed for said purpose, is primarily characterized in that the circuit board is mounted at a sufficient distance in front of the supporting plate to form a free wire laying space behind the circuit board, between said board and the supporting plate, in that the supporting plate is provided with one or more wire lead-in openings which are located behind the circuit board, and in that the circuit board is provided with one or more wire lead-in openings which are formed by cut-outs in the circuit board, extending into said board from edge portions thereof, the wire lead-in openings in the supporting plate being located in displaced positions in the supporting plate in relation to the wire lead-in openings in the circuit board and at a distance from the latter openings.

The above design of the junction box according to the invention makes it possible to simplify to a great extent the required operations to be effected by an installer in connection with drawing in wires into the junction box and connecting conductors thereof to terminals forming part of the terminal blocks mounted to the circuit board. Moreover, the invention also makes it possible to achieve a satisfactory holding of the wires in the junction box without requiring any special means for relieving them from outer pulling forces.

According to the invention, the wire lead-in openings in the supporting plate may preferably be substantially larger than the wire lead-in openings in the circuit board. Such a design of the wire lead-in openings makes it possible to permit several wires intended to be connected to the circuit board, for instance an incoming wire and one or more outgoing wires, to extend through one and the same opening in the supporting plate, while the individual conductors of each wire may extend from the rear side of the circuit board to the front side thereof through one or more wire lead-in openings in the circuit board for each wire.

In order to facilitate the installation, the space between the circuit board and the supporting plate may suitably be laterally open at least within the region of each wire lead-in opening provided in the circuit board. In this case, the junction box may comprise a cover which is adapted to be releasably mounted in front of the circuit board and provided with side walls, extending in a rearward direction from a front wall of the cover and arranged to cover said space laterally.

According to the invention, the circuit board may comprise a plurality of circuit board modules, located in side-by-side relationship and preferably formed in one single piece, and at least some of which have terminal blocks mounted thereto and wire lead-in openings provided therein. The supporting plate may then suitably be provided with one or more wire leadin openings behind each circuit board module provided with terminal blocks and wire lead-in openings. Such a design of the junction box results in each wire intended to be connected to a certain circuit board module being inserted through a wire lead-in opening in the supporting plate located behind said module. Moreover, the two circuit board modules within each pair of adjacent circuit board modules having terminal blocks mounted thereto may be provided with at least one common wire lead-in opening which is located at the transition between said two modules and extends into each one of said two modules. By providing the circuit board with such wire lead-in openings common to two adjacent circuit board modules it is possible to achieve a reduction of the total number of separate wire lead-in openings in the circuit board.

The junction box may be designed so as to be mounted in a distribution frame. In order to make it possible to mount the junction box in an easy manner, the supporting plate may then suitably be provided with two mounting flanges which are located at opposite ends thereof and by means of which the supporting plate may be mounted to two vertical uprights of a distribution frame.

If the junction box is instead intended to be wall-mounted, the supporting plate may preferably be provided with spacing means projecting therefrom at the rear side thererof and serving to ensure that, when mounted to a wall, the supporting plate will be located at a sufficient distance in front of said wall to form a wire laying space behind the supporting plate, between the latter and said wall.

BRIEF DESCRIPTION OF THE DRAWINGS

Below the invention will be described in further detail with reference to the accompanying drawings, in which.

DETAILED DESCRIPTION OF THE PREFERRED EMBODIMENTS OF THE INVENTION

Figure 1:
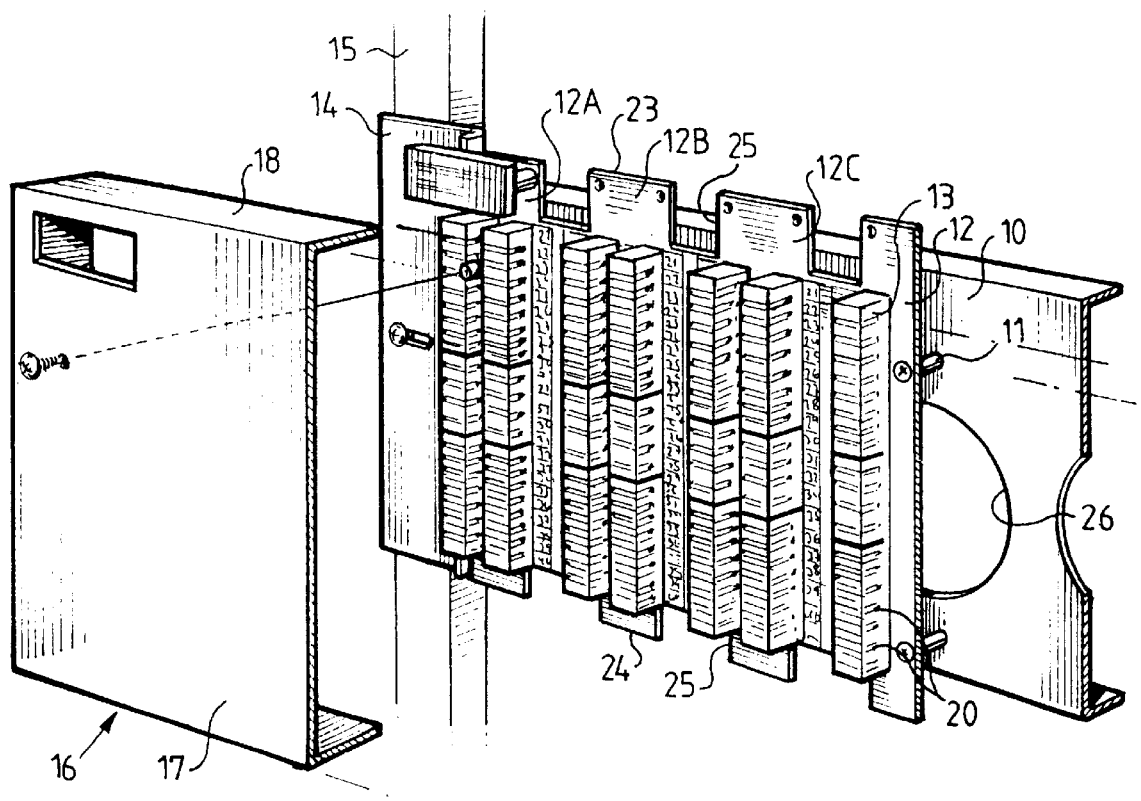
FIG. 1 shows a perspective partial view of a junction box according to a first embodiment of the invention, selected by way of example only and intended to be mounted in a distribution frame.
Figure 2:
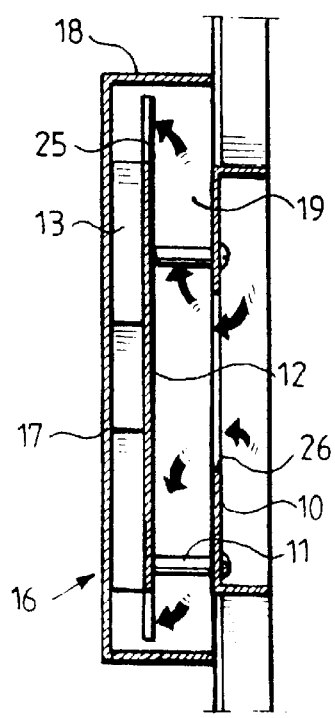
FIG. 2 shows a side elevation, in cross-section, of the junction box according to FIG. 1.
Figure 3:
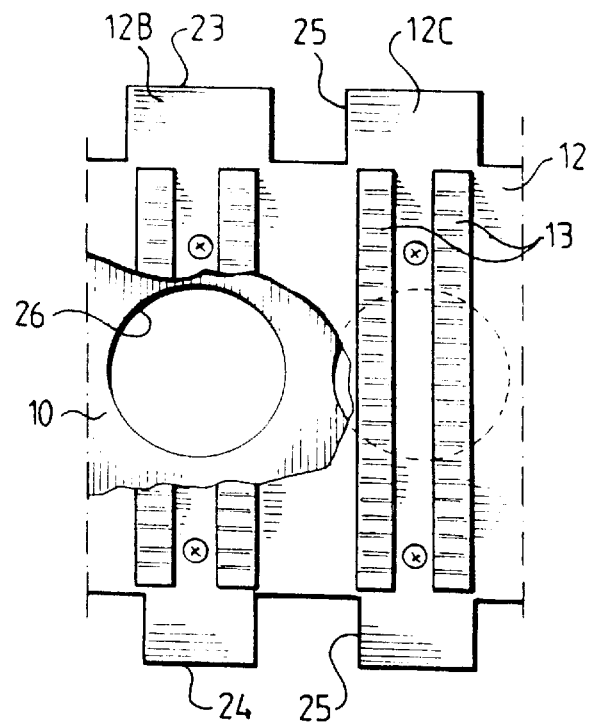
FIG. 3 shows a partial front view of the junction box according to FIGS. 1 and 2 with the cover of said box removed.

The junction box shown in FIGS. 1 and 2 comprises an elongate rectangular supporting plate 10 and a printed circuit board 12, mounted at a distance in front of the supporting plate by means of spacing means 11 and having terminal blocks 13 mounted thereto at its front side.

At its two short sides, supporting plate 10 is provided with projecting mounting flanges 14 by means of which it may be mounted to two vertical uprights 15 of a distribution frame.

Reference numeral 16 designates a cover which may be releasably mounted in front of circuit board 12 and which is provided with side walls 18, extending in a rearward direction from a front wall 17 of said cover and serving to cover the space 19 between supporting plate 10 and circuit board 12 in lateral directions.

Circuit board 12 comprises a plurality of mutually equal modules 12A–12J (FIGS. 4 and 5) forming an integral single piece. At its front side, each such module has two parallel rows of terminal blocks 13. In the illustrated case, these terminal blocks are formed as so-called slot blocks, provided with forwardly and laterally open slots 20 into which insulated conductors may be pressed by a suitable tool and brought into electrical connection with terminals, not shown, which extend into the slots from the rear ends thereof. Each such terminal comprises a contact pin which is inserted into a through hole 21 in circuit board 12 and connected to a conductor 22 printed on the rear side of the circuit board. In the case shown in FIGS. 4 and 5, conductors 22 are arranged to connect opposite terminals of the two parallel rows of terminal blocks 13 on each circuit board module to each other.

Figure 4:
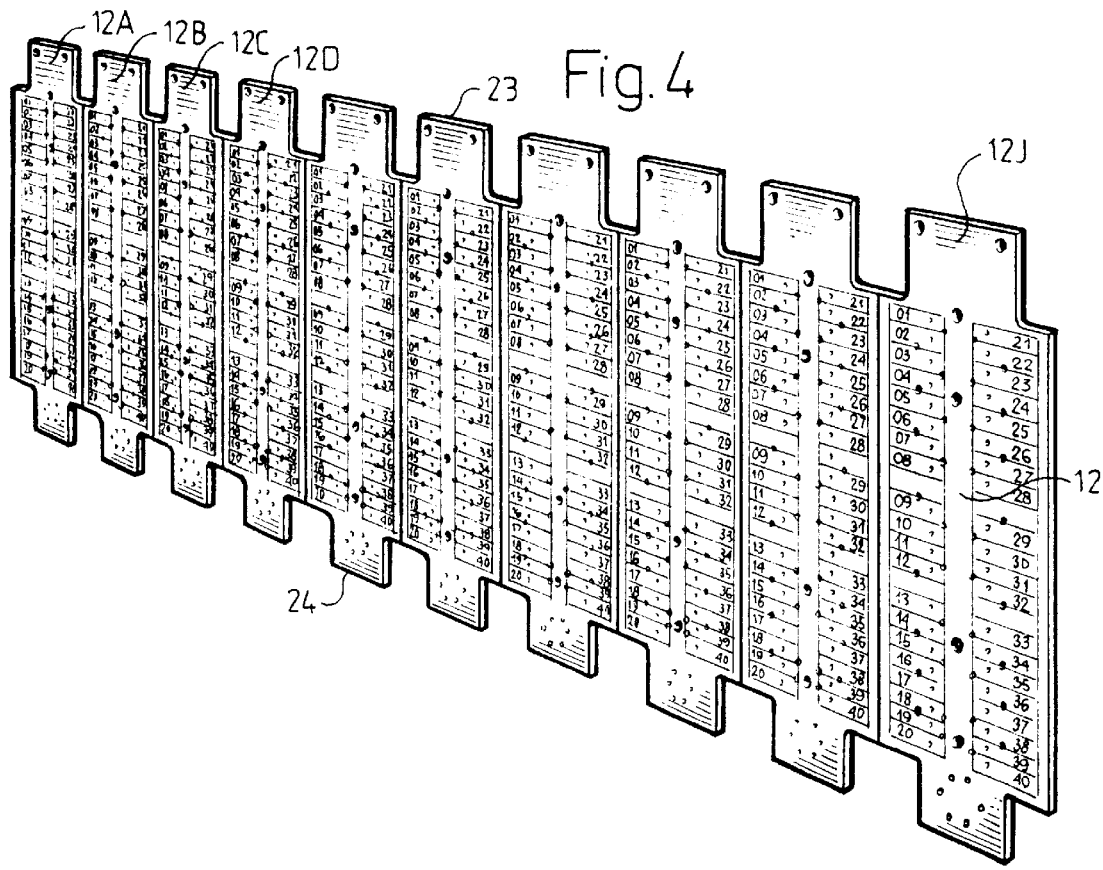
FIG. 4 shows an inclined perspective front view of a circuit board forming part of the junction box according to FIGS. 1 to 3.
Figure 5:
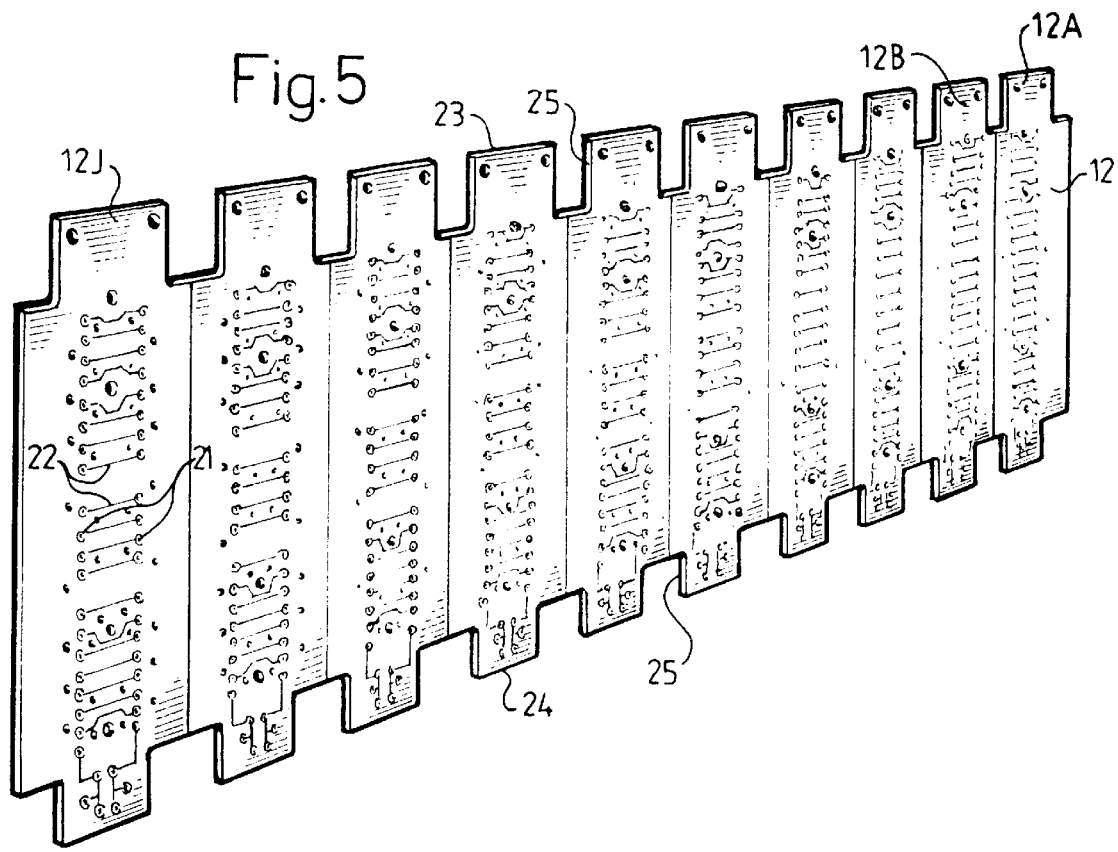
FIG. 5 shows an inclined perspective rear view of the circuit board according to FIG. 4.

As may be seen from FIGS. 1, 4 and 5, along its two longitudinal edges 23 and 24, circuit board 12 is provided with a plurality of openings 25 having the shape of generally rectangular cut-outs and extending into the circuit board from said edges thereof. These openings 25 include on the one hand four openings provided at the different four corners of circuit board 12, and on the other hand openings provided at the transition between each pair of adjacent circuit board modules and extending into each one of the two modules of each pair. Openings 25 serve as wire lead-in openings for conductors intended to be connected to terminal blocks 13 located adjacent to said openings.

In supporting plate 10, there is provided a plurality of circular openings 26 which are located in central positions behind different circuit board modules. These openings 26, which are substantially larger than openings 25 in circuit board 12, serve as wire lead-in openings through which external wires may be inserted into the junction box.

When utilizing the above-described junction box, each wire intended to be connected to a terminal block 13 is inserted through that opening 26 in supporting plate 10 that is located behind the circuit board module to which the terminal block 13 in question is mounted. The individual conductors of the wire are then connected to the terminal block after removal of the insulating outer covering and any screen from an end portion of the wire. In this connection, the conductors are placed in positions such as to bring them to extend in a bent shape from space 19 between circuit board 12 and support ting plate 10 to terminal block 13 through an opening 25 in the circuit board. In this regard the arrows shown in FIG. 2 indicate the direction of insertion of two end portions of wires to be connected to a block 13, through opening 26, space 19, over opening 25 to block 13. As a consequence of the fact that space 19 is laterally open, the insertion and connection of the wire may be effected in a manner convenient to an installer. The bending of the conductors of the wire at openings 25 in circuit board 12 and the bending of the wire as a whole preferably effected at opening 26 in the supporting plate result in a firm holding and locking of the wire to the junction box without requiring any special means for said purpose.

Figure 6:
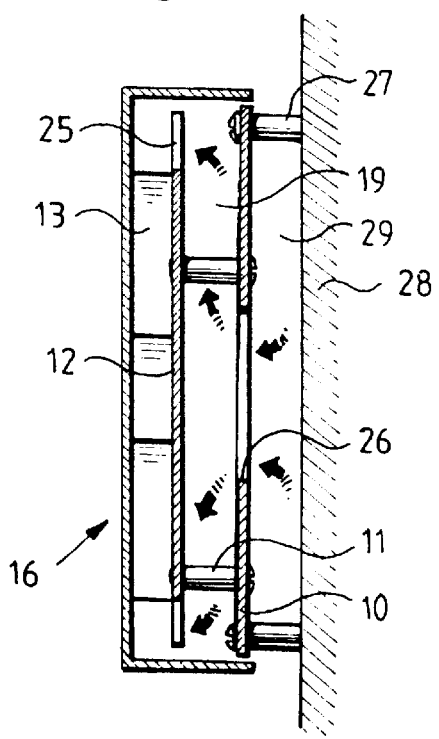
FIG. 6 shows a side elevation cross-sectional view, corresponding to FIG. 2, of a junction box according to a second embodiment of the invention, also selected by way of example only and intended to be mounted on a wall.

FIG. 6 shows a junction box according to an alternative embodiment of the invention which is intended to be wall-mounted. This embodiment differs from the embodiment shown in FIGS. 1 to 5 in that supporting plate 10 has a larger height and lacks flanges extending in a rearward direction therefrom. In the embodiment shown in FIG. 6, supporting plate 10 is provided with spacing means 27 which project from the rear side of said plate and serve to ensure that, when mounted to a wall 28, supporting plate 10 will be located at a sufficient distance in front of said wall to make it possible to draw in wires intended to be connected to the junction box from openings 26 in the supporting plate through the space 29 between supporting plate 10 and wall 28.

The invention is not restricted to the embodiments above described and shown in the drawings. Instead, many other embodiments are feasible within the scope of the invention. For instance, the junction box may contain circuit boards which are provided not only with terminal blocks mounted thereto but also with various electric or electronic components, such as resistors, capacitors and different kinds of semiconductor circuits. Moreover, the wire lead-in openings may have other shapes and be located in other positions than those shown in the drawings.

I claim:

1. A junction box for connecting wires of data and/or telecommunication installations, comprising a printed circuit board (12) which is mounted to a rear supporting plate (10) and is provided with a plurality of terminal blocks (13) mounted to a front side of said circuit board, wherein the circuit board (12) is spaced apart from of a front of the supporting plate (10) to form an open space (19) behind the circuit board (12), and between said circuit board and the supporting plate (10), the supporting plate (10) having at least one first wire lead-in opening (26) through the supporting plate (10) behind the circuit board (12), the circuit board (12) being provided with at least one second wire lead-in opening (25) which is formed by a cut-out in the circuit board (12) extending into said board from an edge portion (23, 24) thereof, the first wire lead-in opening (26) being spaced a distance apart from the second wire lead-in opening (25) in the circuit board (12) and said first wire lead-in opening (26) communicating with said second wire lead-in opening (25) through said open space (19), wherein a wire of said wires is engaged to a selected terminal block of said terminal blocks by initially passing the wire through said first wire lead-in opening (26), on through said open space (19), over the edge portion of circuit board (12), through second wire lead-in opening (25) and on to engage the terminal block, wherein bends made in said wire to reach said terminal block facilitate engagement of said wire to said junction box.

2. A junction box according to claim 1, wherein the first wire lead-in opening (26) in the supporting plate (10) is substantially larger than the second wire lead-in opening (25) in the circuit board (12).

3. A junction box according to claim 1, wherein the space (19) between the circuit board (12) and the supporting plate (10) is laterally open at least within a region of the second wire lead-in opening (25) in the circuit board (12).

4. A junction box according to claim 3, wherein the junction box comprises a cover (16) which is releasably mounted in front of the circuit board (12) and provided with side walls (18), extending in a rearward direction from a front wall (17) of the cover and arranged to cover said space (19) laterally.

5. A junction box according to claim 1, wherein the circuit board (12) has a plurality of circuit board modules (12A–12J) located in a side-by-side relationship in a single piece, and at least some of said modules have said terminal blocks (13) mounted thereto, said circuit board having a plurality of second lead-in opening (25) thereon adjacent to said terminal blocks.

6. A junction box according to claim 5, wherein the supporting plate (10) has a first wire lead-in opening (26) located behind each of said plurality of circuit board modules (12A–12J), and wherein each of said circuit board modules has a terminal block and an adjacent second wire lead-in opening (25).

7. A junction box according to claim 6, wherein two circuit board modules within each pair of adjacent circuit board modules (12A–12J) have terminal blocks (13) mounted thereto provided with at least one common second wire lead-in opening (25) which is located at the transition between said two modules and extends into each of said two modules.

8. A junction box according to claim 1, wherein the supporting plate (10) is provided with two mounting flanges (14) which are located at opposite ends thereof by which the supporting plate may be mounted to two vertical uprights (15) of a distribution frame, and wherein space behind the supporting plate (10) and between the two vertical uprights (15) forms a wire laying space.

9. A junction box according to claim 1, wherein the supporting plate (10) is provided with spacing means (27) which project therefrom at the rear side thereof and which serve to ensure that, when mounted to a wall (28), the supporting plate (10) will be located at a sufficient distance in front of said wall to form a wire laying space (29) behind the supporting plate (10), between the supporting plate (10) and said wall (28).

10. A junction box for connecting wires of data and/or telecommunication installations, comprising a printed circuit board (12) which is mounted to a rear supporting plate (10) and is provided with a plurality of terminal blocks (13) mounted to a front side of said circuit board, wherein the circuit board (12) is spaced apart from of a front of the supporting plate (10) to form an open space (19) behind the circuit board (12), and between said circuit board and the supporting plate (10), the supporting plate (10) having at least one first wire lead-in opening (26) through the supporting plate (10) behind the circuit board (12), the circuit board (12) being provided with at least one second wire lead-in opening (25) which is formed by a cutout in the circuit board (12) extending into said board from an edge portion (23, 24) thereof, the first wire lead-in opening (26) being spaced a distance apart from the second wire lead-in opening (25) in the circuit board (12) and said first wire lead-in opening (26) communicating with said second wire lead-in opening (25) through said open space (19), wherein a wire of said wires is engaged to a selected terminal block of said terminal blocks by initially passing the wire through said first wire lead-in opening (26), on through said open space (19), and over the edge portion of circuit board (12), through second wire lead-in opening (25) and on to engage the terminal block, wherein bends made in said wire to reach said terminal block facilitate engagement of said wire to said junction box, and wherein the first wire lead-in opening (26) in the supporting plate (10) is substantially larger than the second wire lead-in opening (25) in the circuit board (12).

11. A junction box for connecting wires of data and/or telecommunication installations, comprising a printed circuit board (12) which is mounted to a rear supporting plate (10) and is provided with a plurality of terminal blocks (13) mounted to a front side of said circuit board, wherein the circuit board (12) is spaced apart from of a front of the supporting plate (10) to form an open space (19) behind the circuit board (12), and between said circuit board and the supporting plate (10), the supporting plate (10) having at least one first wire lead-in opening (26) through the supporting plate (10) behind the circuit board (12), the circuit board (12) being provided with at least one second wire lead-in opening (25) which is formed by a cut-out in the circuit board (12) extending into said board from an edge portion (23, 24) thereof, the first wire lead-in opening (26) being spaced a distance apart from the second wire lead-in opening (25) in the circuit board (12) and said first wire lead-in opening (26) communicating with said second wire lead-in opening (25) through said open space (19), wherein a wire of said wires is engaged to a selected terminal block of said terminal blocks by initially passing the wire through said first wire lead-in opening (26), on through said open space (19), over the edge portion of circuit board (12), through second wire lead-in opening (25) and on to engage the terminal block, wherein bends made in said wire to reach said terminal block facilitate engagement of said wire to said junction box, wherein the space (19) between the circuit board (12) and the supporting plate (10) is laterally open at least within a region of the second wire lead-in opening (25) in the circuit board (12), and wherein the junction box comprises a cover (16) which is releasably mounted in front of the circuit board (12) and provided with side walls (18), extending in a rearward direction from a front wall (17) of the cover and arranged to cover said space (19) laterally.

* * * * *